United States Patent
Milz et al.

(10) Patent No.: US 11,145,112 B2
(45) Date of Patent: Oct. 12, 2021

(54) METHOD AND VEHICLE CONTROL SYSTEM FOR PRODUCING IMAGES OF A SURROUNDINGS MODEL, AND CORRESPONDING VEHICLE

(71) Applicant: Conti Temic microelectronic GmbH, Nuremberg (DE)

(72) Inventors: Stefan Milz, Sallburg-Ebersdorf (DE); Georg Arbeiter, Kueps (DE)

(73) Assignee: Conti Temic microelectronic GmbH, Nuremberg (DE)

(*) Notice: Subject to any disclaimer, the term of this patent is extended or adjusted under 35 U.S.C. 154(b) by 0 days.

(21) Appl. No.: 16/309,194

(22) PCT Filed: Jun. 20, 2017

(86) PCT No.: PCT/DE2017/200054
§ 371 (c)(1),
(2) Date: Dec. 12, 2018

(87) PCT Pub. No.: WO2017/220092
PCT Pub. Date: Dec. 28, 2017

(65) Prior Publication Data
US 2019/0311523 A1  Oct. 10, 2019

(30) Foreign Application Priority Data

Jun. 23, 2016  (DE) .................... 10 2016 211 227.9

(51) Int. Cl.
*G06T 15/20*  (2011.01)
*G06T 7/80*  (2017.01)
(Continued)

(52) U.S. Cl.
CPC .............. *G06T 15/20* (2013.01); *B60K 35/00* (2013.01); *B60R 1/00* (2013.01); *B60R 11/04* (2013.01);
(Continued)

(58) Field of Classification Search
None
See application file for complete search history.

(56) References Cited

U.S. PATENT DOCUMENTS 9,802,538 B2 * 10/2017 Augst ...................... B60R 1/00
9,922,258 B2    3/2018 Kiyohara et al.
(Continued)

FOREIGN PATENT DOCUMENTS

EP   1 170 173     1/2002
GB   2 361 376    10/2001
(Continued)

OTHER PUBLICATIONS

English translation of the International Search Report of the International Searching Authority for International Application PCT/DE2017/200054, dated Nov. 6, 2017, 3 pages, European Patent Office, HV Rijswijk, Netherlands.
(Continued)

*Primary Examiner* — Christopher G Findley
(74) *Attorney, Agent, or Firm* — W. F. Fasse (57) ABSTRACT

In a method of producing images of a stored three-dimensional model of the surroundings of a vehicle, the images are corrected for perspective. A camera picture is produced by a camera device of the vehicle, and is projected onto a projection surface in the surroundings model. A region relevant for driving is marked in the surroundings model and is projected onto a corresponding projection surface area of the projection surface. An image of the projection surface including the driving-relevant region projected onto the projection surface area is produced and output by a virtual camera that can move freely in the surroundings model.

20 Claims, 6 Drawing Sheets

(51) Int. Cl.
- B60K 35/00 (2006.01)
- B60R 1/00 (2006.01)
- B60R 11/04 (2006.01)
- G05D 1/02 (2020.01)
- G06T 3/00 (2006.01)
- G06T 5/00 (2006.01)
- G06T 5/50 (2006.01)
- G08G 1/16 (2006.01)
- G06T 15/10 (2011.01)
- G06T 19/00 (2011.01)

(52) U.S. Cl.
CPC ............ *G05D 1/0251* (2013.01); *G06T 3/00* (2013.01); *G06T 3/005* (2013.01); *G06T 5/006* (2013.01); *G06T 5/50* (2013.01); *G06T 7/80* (2017.01); *G06T 15/10* (2013.01); *G06T 19/006* (2013.01); *G08G 1/168* (2013.01); *B60K 2370/1529* (2019.05); *B60K 2370/176* (2019.05); *B60K 2370/21* (2019.05); *B60R 2300/20* (2013.01); *B60R 2300/304* (2013.01); *G06T 2207/30264* (2013.01)

(56) References Cited

U.S. PATENT DOCUMENTS

| | | | |
|---|---|---|---|
| 10,112,539 | B2 | 10/2018 | Kameshima et al. |
| 2004/0169617 | A1 | 9/2004 | Yelton et al. |
| 2004/0260469 | A1 | 12/2004 | Mizusawa |
| 2005/0012685 | A1* | 1/2005 | Okada .................. B60R 1/00 345/32 |
| 2008/0136912 | A1 | 6/2008 | Iwano |
| 2011/0032374 | A1 | 2/2011 | Imanishi et al. |
| 2012/0300075 | A1* | 11/2012 | Yamamoto ............ H04N 7/185 348/148 |
| 2014/0104424 | A1 | 4/2014 | Zhang et al. |
| 2014/0111637 | A1 | 4/2014 | Zhang et al. |
| 2014/0114534 | A1 | 4/2014 | Zhang et al. |
| 2014/0152778 | A1* | 6/2014 | Ihlenburg ............ G06T 15/205 348/47 |
| 2014/0214260 | A1 | 7/2014 | Eckert et al. |
| 2014/0278049 | A1 | 9/2014 | Grewe et al. |
| 2014/0278065 | A1* | 9/2014 | Ren .................... G06T 17/00 701/454 |
| 2014/0346359 | A1 | 11/2014 | Holliday |
| 2015/0042799 | A1 | 2/2015 | Zhang et al. |
| 2015/0109444 | A1 | 4/2015 | Zhang et al. |
| 2015/0110420 | A1* | 4/2015 | Li ........................ G06T 15/20 382/285 |
| 2016/0080699 | A1 | 3/2016 | Scholl et al. |
| 2016/0086333 | A1 | 3/2016 | Scholl et al. |
| 2016/0311374 | A1 | 10/2016 | May |
| 2017/0259831 | A1* | 9/2017 | Hoshino ............... B60W 50/14 |
| 2017/0358056 | A1 | 12/2017 | Higuchi et al. |
| 2018/0040103 | A1* | 2/2018 | Esparza Garcia ........ B60R 1/00 |
| 2020/0112675 | A1 | 4/2020 | Arbeiter et al. |

FOREIGN PATENT DOCUMENTS

| | | |
|---|---|---|
| JP | 2004-021307 A | 1/2004 |
| JP | 2014-198531 A | 10/2014 |
| JP | 2015-179482 A | 10/2015 |
| WO | WO 2013/060323 | 5/2013 |
| WO | WO 2014/084251 | 6/2014 |

OTHER PUBLICATIONS

PCT International Preliminary Report on Patentability including English Translation of PCT Written Opinion of the International Searching Authority for International Application PCT/DE2017/200054, dated Dec. 25, 2018, 5 pages, International Bureau of WIPO, Geneva, Switzerland.

Nick Michiels et al., "Interactive Augmented Omnidirectional Video with Realistic Lighting", In: "Lecture Notes on Computer Science, vol. 8853", Augmented and Virtual Reality Conference (AVR 2014), Sep. 17, 2014, XP047302733, ISBN: 978-3-642-27168-7, ISSN: 0302-9743, pp. 247 to 263.

Mengmeng Yu et al., "A Visual Parking Guidance for Surround View Monitoring System", 2015 IEEE Intelligent Vehicles Symposium (IV), Jun. 28, 2015, XP055418725, ISBN: 978-1-4673-7266-4, pp. 53 to 58.

Seiya Shimizu et al., "Wraparound View System for Motor Vehicles", Fujitsu Scientific and Technical Journal, vol. 46, No. 1, Jan. 2010, XP055349887, ISSN: 0016-2523, pp. 95 to 102.

Japanese Office Action dated Apr. 28, 2021 in Japanese Patent Application No. 2018-565656, 3 pages, with English partial summary, 2 pages.

* cited by examiner

METHOD AND VEHICLE CONTROL SYSTEM FOR PRODUCING IMAGES OF A SURROUNDINGS MODEL, AND CORRESPONDING VEHICLE

FIELD OF THE INVENTION

The invention relates to a method for producing images of a stored three-dimensional surroundings model, said images having been corrected for perspective, a vehicle control system of a vehicle for producing images of a stored three-dimensional model of the surroundings of the vehicle, said images having been corrected for perspective, and a vehicle having a vehicle control system.

BACKGROUND INFORMATION

Surroundings models like those known, for example, from WO 2013/060323 A1 can help the driver or a driver assistance system to control the vehicle. A parking assist system can, for example, display a camera picture to the driver on a display, the expected trajectory of the vehicle being drawn in by means of auxiliary lines in said camera picture. It is enormously important that these auxiliary lines are also displayed at the correct location in the event of the camera alignment being altered, in order to prevent the driver wrongly estimating the vehicle movement and colliding with objects.

SUMMARY OF THE INVENTION

It is therefore an object of the invention to provide images of a surroundings model, in which regions relevant for driving are drawn in correctly.

This object can be achieved by a method for producing perspective-corrected images of a stored three-dimensional model of the surroundings of a vehicle, a vehicle control system for producing perspective-corrected images of a stored three-dimensional surroundings model, and a vehicle, respectively having features according to various aspects of the invention as set forth herein.

According to a first aspect, the invention accordingly relates to a method for producing images of a stored three-dimensional model of the surroundings of a vehicle, said images having been corrected for perspective. At least one camera picture is produced by a camera device of the vehicle and the produced camera picture is projected onto a projection surface in the stored three-dimensional model of the surroundings of the vehicle. A region relevant for driving is marked in said stored three-dimensional surroundings model. The method further comprises the projecting of the marked region onto a corresponding projection surface area of the projection surface, in order to identify an image region of the camera picture projected onto the projection surface corresponding to the marked region as having been corrected for perspective. An image of the projection surface with the region projected onto the projection surface area is produced by means of a virtual camera that can move freely in the surroundings model, and the produced image is output.

The term 'vehicle' denotes, in particular, a motor vehicle, in particular a car, a motorcycle, an E-bike, a truck, a ship or boat or even an airplane.

The term 'image of the surroundings model' denotes an image of a particular spatial partial region of the surroundings model produced by means of the virtual camera, wherein the image depends on a position and alignment of the virtual camera.

The term 'projection surface' denotes a two-dimensional hypersurface in the three-dimensional surroundings model, which can be shaped and curved in any way desired. The projection surface can be a flat plane, a spherical shell segment, a cylindrical surface or a paraboloidal or hyperboloidal face.

The term 'region relevant for driving' denotes a region of the surroundings model, which corresponds to a real spatial region of the surroundings of the vehicle, which is important for navigating the vehicle. The real spatial region can, for example, be a spatial area, in which objects or obstacles which are impassable for the vehicle are located. The real spatial region can also correspond to a trajectory of the vehicle, along which the vehicle would move without the driving parameters being altered. The real spatial region can further be a particular range of distance from the vehicle or correspond to a parking space. The real spatial region can be a zero-dimensional dot-shaped region, a one-dimensional, in particular also a curved, linear region, a two-dimensional, possibly curved surface, or a three-dimensional volume region.

The fact that the marked region is projected directly onto the projection surface area of the projection surface means that this is directly identified in the camera picture projected onto the projection surface. If the viewing direction onto the projection surface is changed due to the movement of the virtual camera, the projection surface area nevertheless remains at the correct position such that aberration effects can be prevented. Such perspective errors are consequently corrected by the method according to the invention.

The method according to the invention improves the representation of the region relevant for driving. Thus, it is only possible for the vehicle's driving function to be controlled by a driver assistance system on the basis of the produced images once the images have been corrected for perspective since, otherwise, wrongly drawn-in regions relevant for driving could be evaluated. The method consequently improves the precision and accuracy of the produced images and therefore also largely increases safety, since the images have of course been corrected for perspective and are free of perspective errors.

According to one preferred embodiment of the method, the marked region is projected onto the projection surface, in that a respective point of the marked region is imaged onto an intersection of a corresponding connecting line with the projection surface, wherein the connecting line connects this point of the marked region to a predefined reference point of the surroundings model. The reference point consequently designates a possible position of the movable virtual camera, viewed from which the region relevant for driving is projected onto the projection surface by central projection. The projection surface preferably lies between the reference point and the region relevant for driving, however the region relevant for driving can also be located between the reference point and the projection surface.

According to one preferred further development of the method, the camera device has at least one vehicle camera, wherein the reference point of the surroundings model corresponds to a spatial position of that vehicle camera which produces the camera picture imaged onto the projection surface. Consequently, it is ensured that, due to the projecting of the marked region, said marked region is drawn in at the correct location of the projection surface, since an image produced from the perspective of the reference point reflects the real conditions with the region relevant for driving located at the correct position.

According to one preferred further development of the method, a camera position and/or camera alignment of the freely movable virtual camera is/are determined on the basis of sensor data produced by sensors of the vehicle and/or captured parameters of the vehicle. Thus, for instance in hazardous situations such as during reversing or when turning into an unclear road, the position of the virtual camera can be automatically continually moved, in order to consequently output images from a viewing direction which is convenient for the driver or which can be easily evaluated by the driver assistance system. Possible vehicle parameters are the speed or position of the vehicle or an angular position of the wheels of the vehicle.

According to one preferred embodiment of the method, a driver assistance system controls a function of the vehicle on the basis of the output images. The vehicle functions can comprise actuating and enabling or disabling actuators such as, for instance, indicators or side mirrors, or also semi-autonomous or autonomous acceleration, braking or steering of the vehicle.

According to one preferred embodiment of the method, the output images are displayed to a driver of the vehicle on a display apparatus. This therefore provides the driver with an accurate overview of the vehicle surroundings, wherein regions relevant for driving are drawn in correctly in terms of perspective.

According to one preferred further development of the method, the region relevant for driving is marked in the stored three-dimensional surroundings model on the basis of sensor data produced by sensors of the vehicle and/or captured parameters of the vehicle. For example, distances of objects can be measured on the basis of radar sensors and, as a result, regions relevant for driving of the surroundings model, which correspond to spatial regions occupied by objects, are identified.

According to a further aspect, the invention comprises a vehicle control system of a vehicle for producing images of a stored three-dimensional model of the surroundings of the vehicle, said images having been corrected for perspective. The vehicle control system comprises a camera device which is configured to produce at least one camera picture, as well as a computing device. The computing device is configured to project the produced camera picture onto a projection surface in the stored three-dimensional model of the surroundings of the vehicle, to mark a region relevant for driving in the stored three-dimensional surroundings model, and to project the marked region onto a corresponding projection surface area of the projection surface. The computing device is consequently configured to identify an image region of the camera picture projected onto the projection surface corresponding to the marked region as having been corrected for perspective. The computing device is further configured to produce an image of the projection surface with the region projected onto the projection surface area by means of a virtual camera that can move freely in the surroundings model, and to output the produced image.

According to one further development of the vehicle control system, the computing device is further configured to project the marked region onto the projection surface, in that it images a respective point of the marked region onto an intersection of a corresponding connecting line with the projection surface, wherein the connecting line connects this point of the marked region to a predefined reference point of the surroundings model.

According to one preferred further development of the vehicle control system, the camera device has at least one vehicle camera, wherein the reference point of the surroundings model corresponds to a spatial position of that vehicle camera which produces the camera picture imaged onto the projection surface.

According to one further embodiment, the vehicle control system comprises at least one sensor of the vehicle, which is configured to produce sensor data and/or to capture parameters of the vehicle. The computing device is configured to mark the region relevant for driving in the stored three-dimensional surroundings model on the basis of the produced sensor data and/or on the basis of the captured parameters of the vehicle.

According to one further embodiment of the vehicle control system, the computing device is configured to determine a camera position and/or camera alignment of the freely movable virtual camera on the basis of the produced sensor data and/or on the basis of the captured parameters of the vehicle.

According to one preferred embodiment, the vehicle control system has a driver assistance system which is configured to control a function of the vehicle on the basis of the output images.

According to one preferred embodiment of the vehicle control system, the output device has a display apparatus, on which the output images can be displayed to a driver of the vehicle.

According to a third aspect, the invention provides a vehicle having a vehicle control system.

BRIEF DESCRIPTION OF THE DRAWINGS

The present invention is explained in greater detail below on the basis of the embodiment examples indicated in the schematic figures of the drawings, wherein.

DETAILED DESCRIPTION OF EXAMPLE EMBODIMENTS OF THE INVENTION

In all of the figures, similar elements and apparatuses or respectively elements and apparatuses having similar functions are provided with the same reference numerals. The method steps are numbered for reasons of clarity. This is not, in general, intended to imply a specific temporal sequence. In particular, multiple method steps can be carried out simultaneously. Furthermore, various embodiments can be combined with each other at will, inasmuch as this makes sense.

Figure 1:
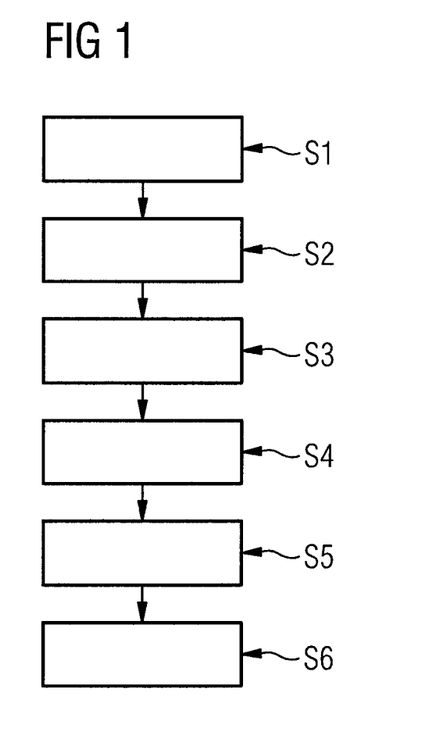
FIG. 1 shows a flow chart in order to explain a method for producing images of a stored three-dimensional surroundings model of a vehicle, said images having been corrected for perspective, according to one embodiment of the invention.

FIG. 1 shows a flow chart in order to explain a method for producing images of a stored three-dimensional surroundings model of a vehicle, said images having been corrected for perspective, according to one embodiment of the invention.

Figure 2:
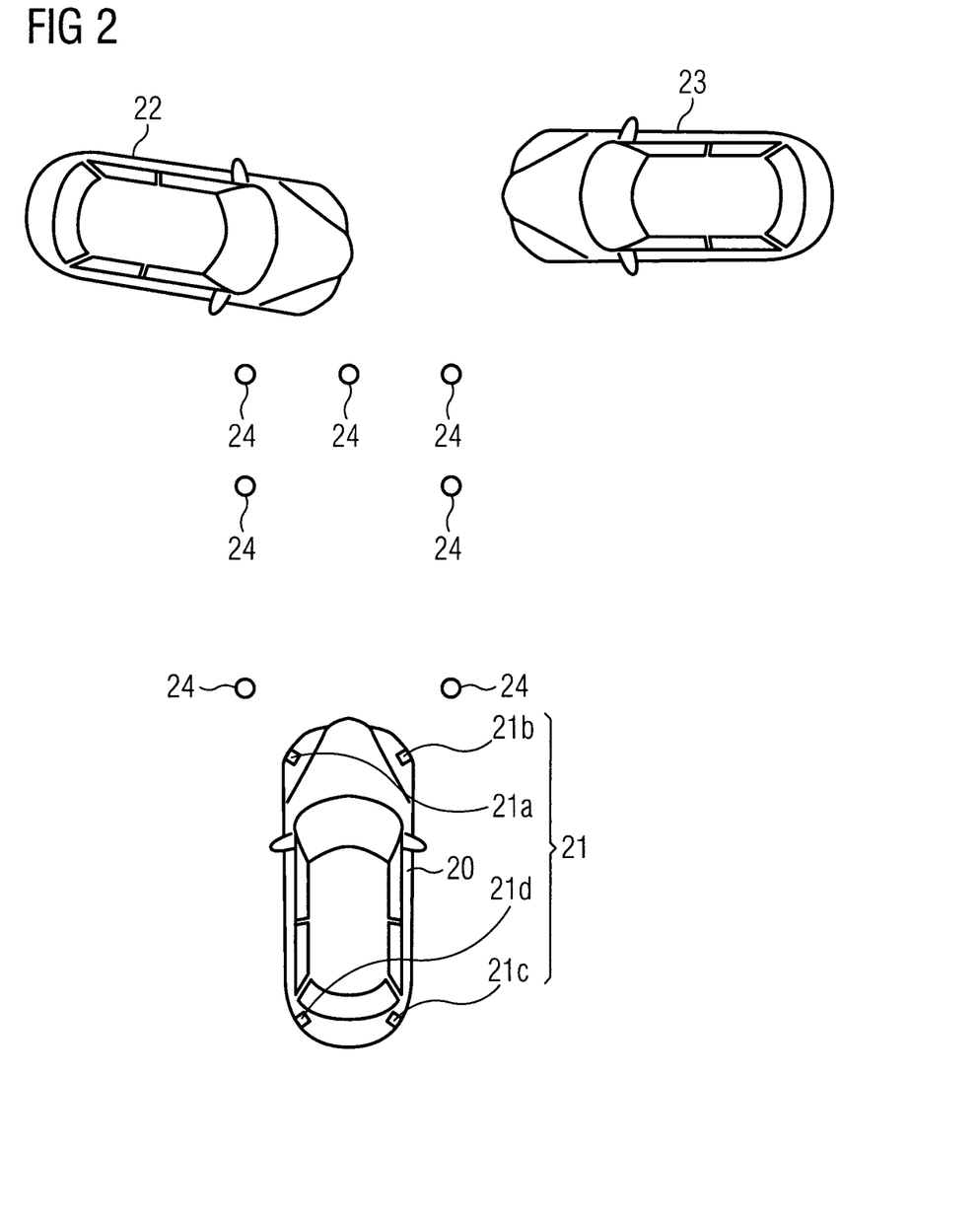
FIG. 2 shows a top view of an exemplary scenario in order to explain the method according to the invention.

In FIG. 2, an exemplary scenario is illustrated in a top view which shows a vehicle 20 which is equipped with a camera device 21 which has vehicle cameras 21a-21d mounted around the vehicle. Boundary posts 24 as well as further road users 22, 23 are located in the surroundings of the vehicle 20.

In a first method step S1, at least one camera picture of the surroundings of the vehicle 20 is produced by the camera device 21 of the vehicle 20.

Figure 3:
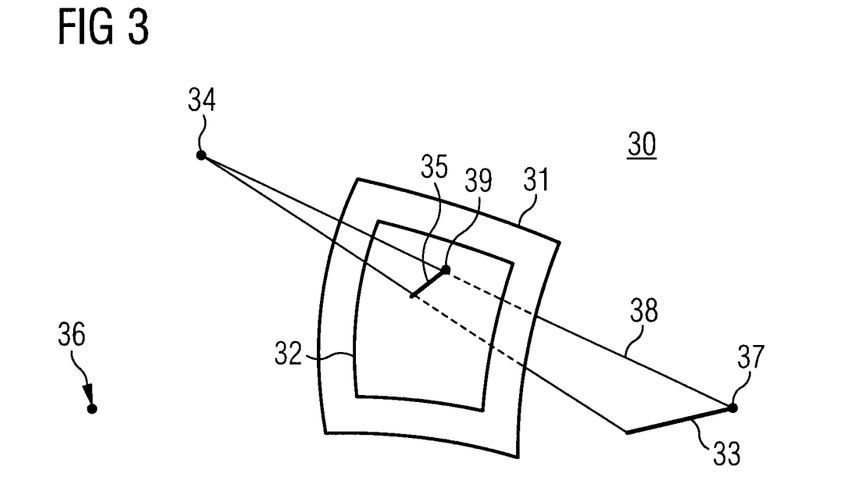
FIG. 3 shows a schematic view of a surroundings model in order to explain the projecting of a marked region.

A three-dimensional model 30 of the surroundings of the vehicle 20 is further provided, which is schematically illustrated in FIG. 3. The three-dimensional surroundings model is preferably stored in a memory of a vehicle control system of the vehicle 20. A projection surface 31, which is for example arranged cylindrically around an origin of coordinates 36 of the surroundings model 30, is determined in the surroundings model 30, wherein the origin of coordinates 36 corresponds to a position of the vehicle 20. The projection surface 31 can also correspond to a spherical surface arranged around the origin of coordinates 36 or a partial region of a spherical surface. The shape of the projection surface is not limited to the indicated examples.

In a second method step S2, the produced camera picture 32 is projected onto the projection surface 31.

In a further method step S3, a region 33 relevant for driving is marked or identified in the stored three-dimensional surroundings model. The marking or identifying S3 is preferably carried out automatically, in particular on the basis of sensor data and/or parameters of the vehicle, which are preferably produced or respectively established by at least one sensor of the vehicle 20. Thus, a region 33 relevant for driving, which corresponds to an expected trajectory of the vehicle 20, is, for example, determined on the basis of an angular position of the wheels of the vehicle measured by the at least one vehicle sensor, and marked or identified in the surroundings model. For example, the region 33 relevant for driving can be marked or identified with color in the surroundings model. A reference point 34 of the surroundings model 30 is further marked or identified, which corresponds to a spatial position of that vehicle camera which produces the camera picture 32 imaged onto the projection surface 31.

With respect to this reference point 34, the marked or identified relevant region 33 that is relevant for driving is projected onto a corresponding projection surface area 35 of the projection surface 31 in a further method step S4. The projection surface area 35 is an image region of the camera picture projected onto the projection surface, which corresponds to the marked or identified relevant region 33, which is consequently marked in a perspective-corrected manner. To this end, an intersection 39 of the projection surface 31 with a connecting line 38 is determined for each point 37 of the marked or identified relevant region 33, wherein the connecting line 38 connects this point 37 to the reference point 34.

In a further method step S5, an image of the projection surface 31 is produced with the region 33 projected onto the projection surface area 35 by means of a virtual camera that can move freely in the surroundings model 30, and the produced image is output in a subsequent method step S6.

Figure 4:
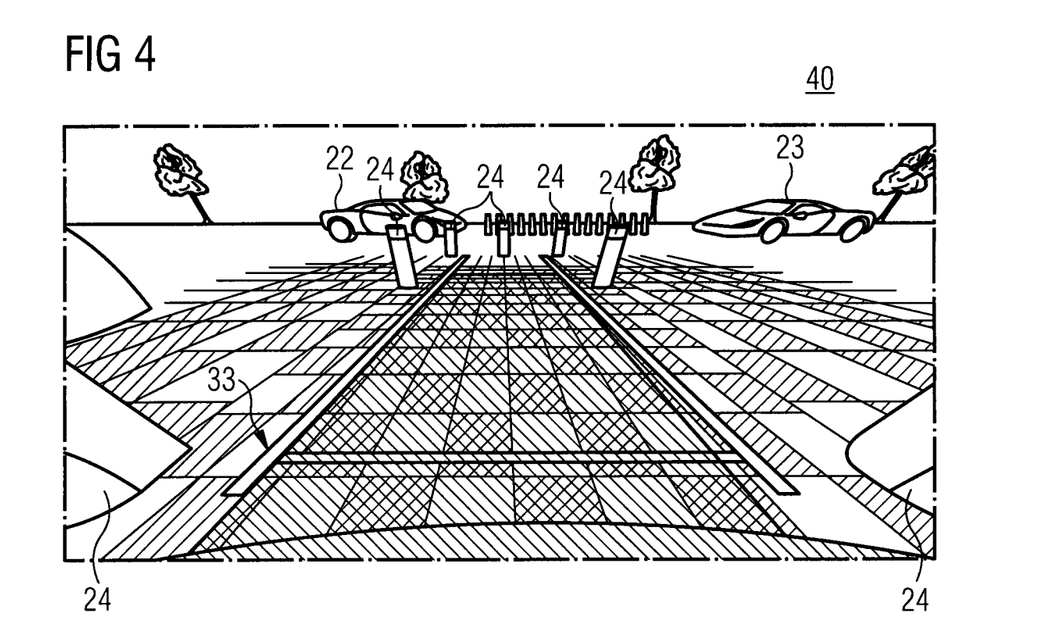
FIG. 4 shows an exemplary image from a first camera perspective.

FIG. 4 shows a produced first image 40 which is acquired by means of a virtual camera located at the reference point 34. Here, the marked region 33 relevant for driving is located at the correct position and displays a trajectory, along which the vehicle will move if it retains its driving parameters, to the driver of the vehicle 21.

A fundamental point of the invention is that the region relevant for driving is projected onto the projection surface and the projection surface with the region projected onto the projection surface area is imaged. This differs from the image which would be produced by acquiring the projection surface and the region relevant for driving itself.

Figure 5:
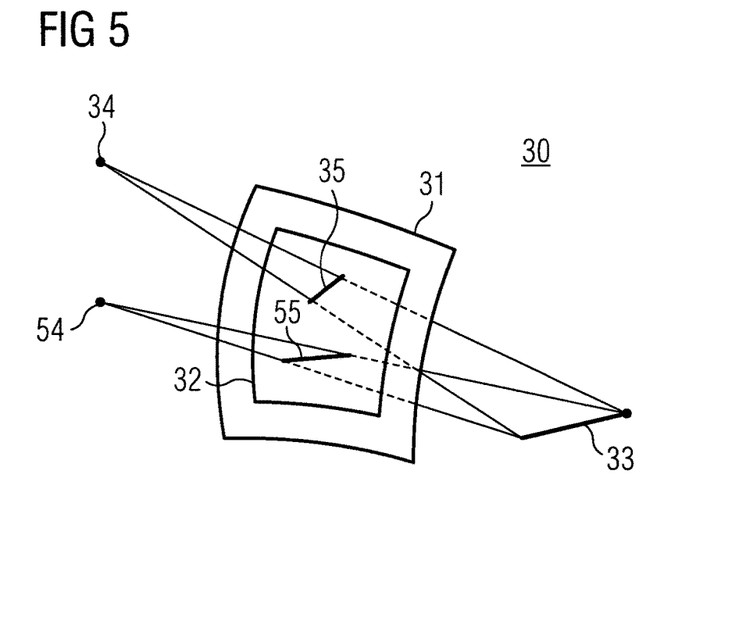
FIG. 5 shows a view of a surroundings model in order to explain the aberration effect avoided by the invention.
Figure 6:
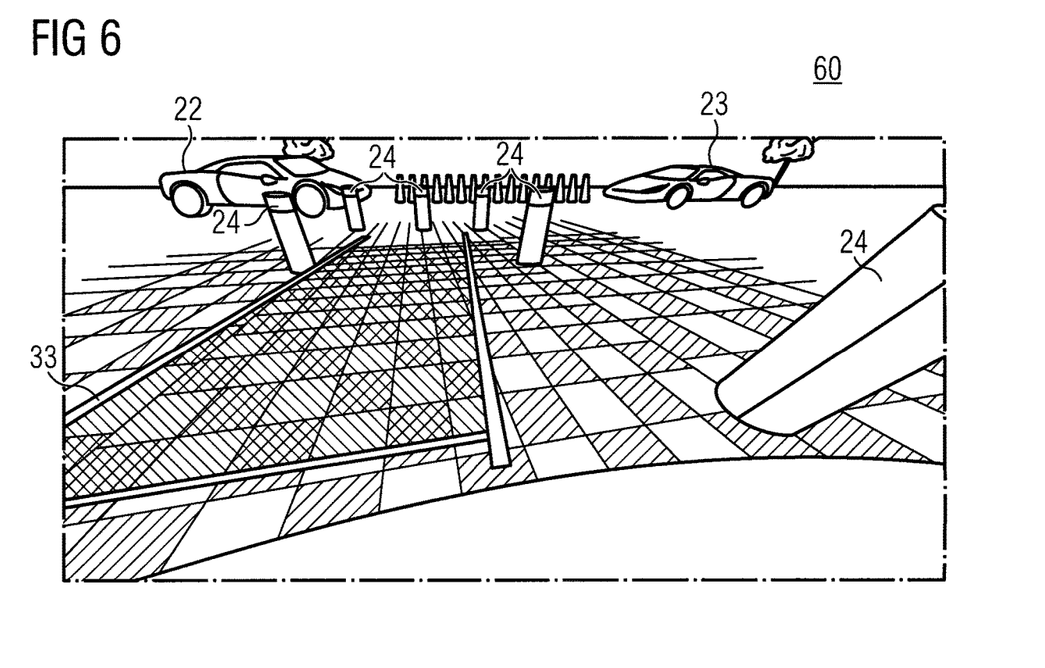
FIG. 6 shows an image having an aberration error.

By way of comparison, such a method is illustrated in FIG. 5 but is not part of the invention. If the virtual camera is displaced from the reference point 34 to a predefined camera spatial point 54, said camera captures a picture of the projection surface 31 as well as the marked region 33 relevant for driving, the region 33 relevant for driving appears in a corresponding image at a displaced position 55 of the projected camera picture 32. This is illustrated in FIG. 6 which shows a second image 60 which is acquired with this method and which is not comprised by the invention. It can be seen that, during this displacement of the virtual camera to the camera spatial point 54, a displacement of the imaged region 33 relevant for driving does not correspond to a displacement of the image section itself. Due to this aberration effect, the trajectory of the vehicle is not displayed correctly in the indicated example.

Figure 7:
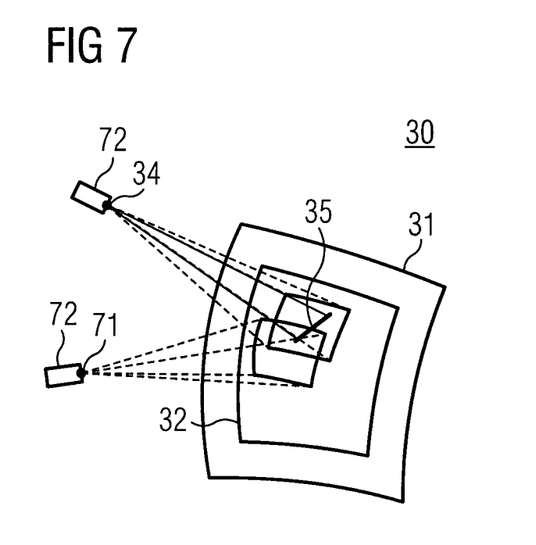
FIG. 7 shows a schematic view of the surroundings model having a virtual camera that can move freely.

In contrast thereto, FIG. 7 explains the producing of images of the projection surface 31 with the region 33 projected onto the projection surface area 35 according to the invention. Here, a virtual camera 72 is drawn in by way of example at the reference point 34 and at a further camera spatial point 71. Irrespective of a camera position of the virtual camera 72 and of an alignment of the virtual camera 72, the projection surface area 35 always appears at the same, i.e. the correct, position of the camera picture 32 on the projection surface 31.

Figure 8:
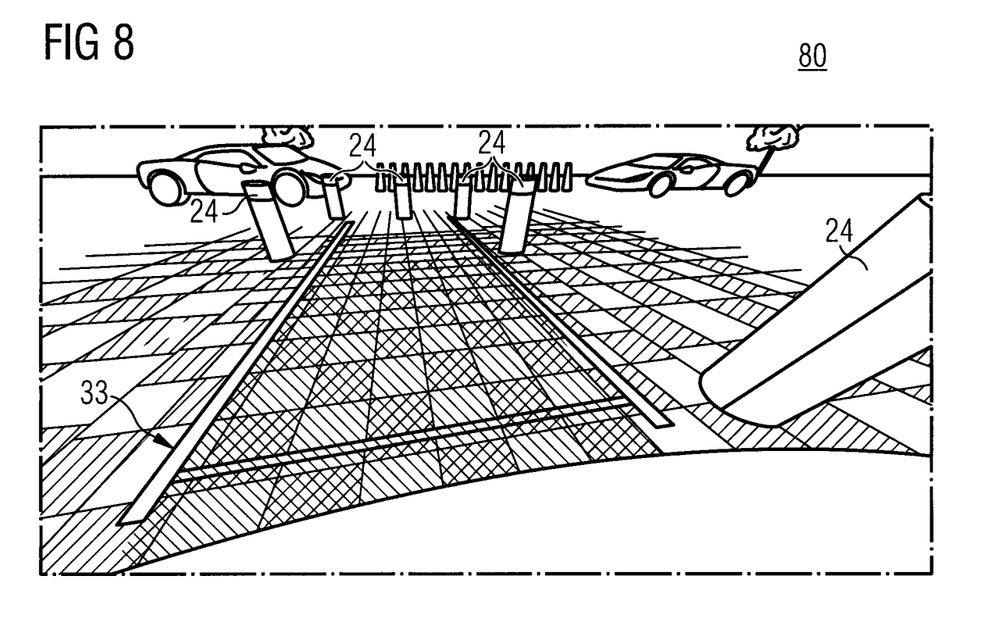
FIG. 8 shows an exemplary image from a second camera perspective.

FIG. 8 shows, by way of example, a third image 80 which has been acquired by means of the virtual camera 72 at the further camera spatial point 71. As can be seen, the region 33 relevant for driving is now, in turn, located at the right position of the produced image.

As a result, the method makes it possible to correct the perspective of the image by preventing an aberration effect.

According to one further embodiment, the camera position and/or camera alignment of the freely movable virtual camera 72 is/are determined on the basis of sensor data produced by sensors of the vehicle 20 and/or particular parameters of the vehicle 20. The camera position of the virtual camera can thus be continually and uniformly displaced, and appropriate continual images can be produced.

According to one embodiment, the produced images are output to a driver assistance system which controls a function of the vehicle on the basis of the output images. For example, an advantageous camera view for the driver assistance system can be selected, which is distinguished by an optimum perspective view, as a result of which the required computing time and computing performance of the driver assistance system for evaluation can be reduced. Starting from this camera perspective, the driver assistance system can control the vehicle partially autonomously or autonomously. It is only possible for the driver assistance system to control the vehicle precisely, if the regions relevant for driving are drawn in correctly.

According to one preferred further development, the output images are displayed to a driver of the vehicle 20 on a display apparatus of the vehicle 20.

Figure 9:
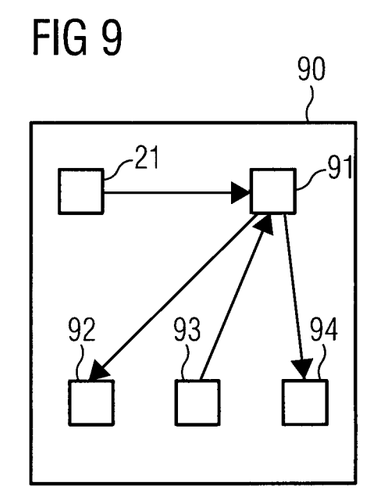
FIG. 9 shows a schematic block diagram in order to explain a vehicle control system according to one embodiment of the invention.

FIG. 9 shows a block diagram in order to explain a vehicle control system 90 of a vehicle 20 for producing images of a stored three-dimensional model of the surroundings 30 of the vehicle 20, said images having been corrected for perspective. The vehicle control system 90 has a camera device 21 which is configured to produce at least one camera picture 32. The camera device 21 can comprise a multitude of vehicle cameras 21a-21d which allow a surround view of the environment of the vehicle 20. The vehicle control system further has a storage device, on which a three-dimensional model of the surroundings of the vehicle 20 is stored. According to one further embodiment, the three-dimensional surroundings model 30 can also be made available to the vehicle control system by means of an interface.

The vehicle control system 90 comprises a computing device 91 which is configured to project the produced camera picture onto a projection surface 31 in the stored three-dimensional surroundings model of the vehicle. The projection surface 31 can be predefined or can be determined by the computing device 91 itself.

The computing device 91 is further configured to mark a region relevant for driving in the stored three-dimensional surroundings model. To this end, the vehicle control system 90 can optionally have at least one vehicle sensor 93 which is configured to produce sensor data and/or capture parameters of the vehicle 20. Such vehicle sensors 93 comprise radar systems, lidar systems, optical cameras, infrared cameras or laser systems. The region relevant for driving which corresponds, for example, to a parking space, a trajectory of the vehicle or an obstacle, can be recognized on the basis of the sensor data by the computing device 91 and recorded and marked in the surroundings model 30.

The computing device 91 is further configured to project the marked region 33 onto a corresponding projection surface area 35 of the projection surface 31. As a result, the computing device 91 identifies an image region of the camera picture 32 projected onto the projection surface 31 corresponding to the marked area 32 in a way which indicates it has been corrected for perspective. The computing device 91 is further configured to produce an image of the projection surface with the region 33 projected onto the projection surface area 35 by means of a virtual camera 72 that can move freely in the surroundings model 30.

The vehicle control system 90 further has an output device 92 which is configured to output the produced image. The output device 92 can have an interface, in particular a cable connection, a USB interface or a wireless interface. The produced images can, in particular, be transmitted by means of the output device 92 to further units or via car-to-car communication to further vehicles.

Optionally, the vehicle control system 90 further comprises a driver assistance system 94 which is configured to control a function of the vehicle 20 on the basis of the output images.

According to one preferred further development, the output device 92 has a display apparatus which is arranged in an interior of the vehicle 20 and displays the output images to a driver of the vehicle 20.

Figure 10:
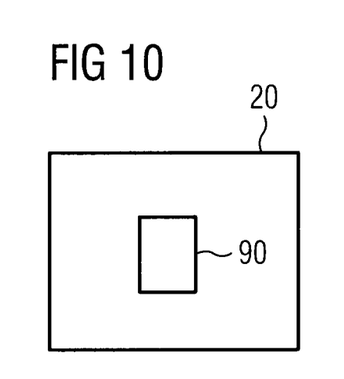
FIG. 10 shows a schematic block diagram of a vehicle according to one embodiment of the invention.

FIG. 10 shows an exemplary block diagram of a vehicle 20 having a vehicle control system 90 according to one embodiment of the invention. Here, the vehicle control system 90 can be one of the embodiments indicated above.

LIST OF REFERENCE NUMERALS

20 Vehicle
21 Camera device
21a to 21d Vehicle cameras
22, 23 Further road users
24 Boundary posts
30 Surroundings model
31 Projection surface
32 Camera picture
33 Region relevant for driving
34 Reference point
35 Projection surface area
36 Origin of coordinates
37 Point of the marked region
38 Connecting line
39 Intersection
40 First image
54 Camera spatial point
55 Displaced position
60 Second image
71 Further camera spatial point
72 Virtual camera
80 Third image
90 Vehicle control system
91 Computing device
92 Output device
93 Vehicle sensors
94 Driver assistance system

The invention claimed is:

1. A method of producing images of a stored three-dimensional surroundings model of surroundings of a vehicle, said images having been corrected for perspective, comprising the steps:
   producing at least one camera picture of the surroundings by a camera device of the vehicle;
   projecting the camera picture onto a projection surface in the surroundings model;
   in the surroundings model, identifying a relevant region that is relevant for driving, wherein the identifying of the relevant region includes marking the relevant region in the surroundings model with a line or a color that is synthesized in the surroundings model and does not exist in the at least one camera picture of the surroundings so as to produce a marked relevant region in the surroundings model;
   projecting the marked relevant region of the surroundings model, including the line or the color with which the relevant region has been marked, onto a corresponding projection surface area of the projection surface onto which projection surface the camera picture is also projected, so as to superimpose the marked relevant region and the camera picture with one another on the projection surface and thereby to mark a perspective-corrected image region of the camera picture that is projected onto the projection surface, wherein the marked perspective-corrected image region corresponds to the marked relevant region as having been corrected for perspective;
   producing a virtual camera image of the marked relevant region and the camera picture superimposed with one another on the projection surface so as to represent the marked perspective-corrected image region in the virtual camera image, by a virtual camera that can move freely in the surroundings model; and
   outputting the virtual camera image.

2. The method according to claim 1, wherein the projecting of the marked relevant region onto the projection surface area comprises respectively imaging a respective point of the marked relevant region onto an intersection of a corresponding respective connecting line with the projection surface, wherein the respective connecting line connects the respective point of the marked relevant region to a predefined reference point of the surroundings model.

3. The method according to claim 2, wherein the camera device comprises at least one vehicle camera, and wherein the reference point of the surroundings model corresponds to a spatial position of the vehicle camera that produced the camera picture.

4. The method according to claim 1, further comprising determining a camera position and/or a camera orientation of the virtual camera based on sensor data produced by sensors of the vehicle and/or based on detected vehicle parameters of the vehicle.

5. The method according to claim 1, further comprising controlling a vehicle function of the vehicle with a driver assistance system based on the output virtual camera image.

6. The method according to claim 1, further comprising displaying the output virtual camera image to a driver of the vehicle on a display apparatus.

7. The method according to claim 1, wherein the identifying of the marked relevant region in the surroundings model is performed based on sensor data produced by sensors of the vehicle and/or based on detected vehicle parameters of the vehicle.

8. The method according to claim 1, further comprising performing the method in a vehicle control system of the vehicle, and providing the surroundings model to the vehicle control system from outside of the vehicle control system via an interface.

9. A vehicle control system of a vehicle for producing images of a stored three-dimensional surroundings model of surroundings of the vehicle, said images having been corrected for perspective, comprising:
 a camera device configured to produce at least one camera picture of the surroundings;
 a computing device configured:
  to project the camera picture onto a projection surface in the surroundings model,
  to identify, in the surroundings model, a relevant region that is relevant for driving, by marking the relevant region in the surroundings model with a line or a color that is synthesized in the surroundings model and does not exist in the at least one camera picture of the surroundings so as to produce a marked relevant region in the surroundings model,
  to project the marked relevant region of the surroundings model, including the line or the color with which the relevant region has been marked, onto a corresponding projection surface area of the projection surface onto which projection surface the camera picture is also projected, so as to superimpose the marked relevant region and the camera picture with one another on the projection surface and thereby to mark a perspective-corrected image region of the camera picture that is projected onto the projection surface, wherein the marked perspective-corrected image region corresponds to the marked relevant region as having been corrected for perspective, and
  to produce a virtual camera image of the marked relevant region and the camera picture superimposed with one another on the projection surface so as to represent the marked perspective-corrected image region in the virtual camera image, by a virtual camera that can move freely in the surroundings model; and
 an output device configured to output the virtual camera image.

10. The vehicle control system according to claim 9, wherein the computing device is further configured so that the projecting of the marked relevant region onto the projection surface area comprises respectively imaging a respective point of the marked relevant region onto an intersection of a corresponding respective connecting line with the projection surface, wherein the respective connecting line connects the respective point of the marked relevant region to a predefined reference point of the surroundings model.

11. The vehicle control system according to claim 10, wherein the camera device comprises at least one vehicle camera, and wherein the reference point of the surroundings model corresponds to a spatial position of the vehicle camera that produced the camera picture.

12. The vehicle control system according to claim 9,
 further comprising at least one sensor of the vehicle configured to produce sensor data and/or to detect vehicle parameters of the vehicle;
 wherein the computing device is further configured so that the identifying of the marked relevant region in the surroundings model is performed based on the sensor data and/or based on the detected vehicle parameters of the vehicle.

13. The vehicle control system according to claim 12, wherein the computing device is further configured to determine a camera position and/or a camera orientation of the virtual camera based on the sensor data and/or based on the detected vehicle parameters of the vehicle.

14. The vehicle control system according to claim 9, further comprising a driver assistance system configured to control a vehicle function of the vehicle based on the output virtual camera image.

15. The vehicle control system according to claim 9, wherein the output device comprises a display apparatus configured to display the output virtual camera image to a driver of the vehicle.

16. A vehicle comprising a vehicle control system according to claim 9, and a vehicle body.

17. The vehicle according to claim 16, wherein the vehicle is an airplane and the vehicle body comprises an airplane fuselage.

18. A method comprising the steps:
 a) with a camera system of a vehicle, producing a real camera picture of surroundings of the vehicle;
 b) providing a stored three-dimensional surroundings model of the surroundings of the vehicle;
 c) projecting the real camera picture onto a virtual projection surface;
 d) in the surroundings model, identifying a relevant region that is relevant for driving of the vehicle, wherein the identifying of the relevant region includes marking the relevant region in the surroundings model with a line or a color that is synthesized in the surroundings model and does not exist in the at least one camera picture of the surroundings so as to produce a marked relevant region in the surroundings model;
 e) projecting the marked relevant region of the surroundings model, including the line or the color with which the relevant region has been marked, onto the virtual projection surface that also has the real camera picture projected thereon, so as to superimpose the marked relevant region and the real camera picture with one another on the virtual projection surface;

f) with a virtual camera that is freely movable to different virtual camera positions relative to the virtual projection surface, at a selected one of the virtual camera positions producing a virtual camera image of the virtual projection surface having the real camera picture and the marked relevant region projected and superimposed with one another thereon; and g) outputting the virtual camera image.

19. The method according to claim 18, further comprising automatically controlling a vehicle function in response to and dependent on the output virtual camera image.

20. The method according to claim 18, further comprising moving the virtual camera to a different one of the virtual camera positions in response to and dependent on sensor data produced by at least one sensor of the vehicle or vehicle parameters of the vehicle, and then repeating the steps a) to g) with the virtual camera at the different virtual camera position for the step g).

\* \* \* \* \*